United States Patent [19]
Gorove et al.

[11] Patent Number: 5,325,251
[45] Date of Patent: Jun. 28, 1994

[54] PLANAR ACTUATORS USING LOW PRESSURE AIR BEARINGS AND ROLLING FLEXURE BEARINGS

[75] Inventors: Arpad Gorove; Lester M. Yeakley, both of Boulder, Colo.

[73] Assignee: Storage Technology Corporation, Louisville, Colo.

[21] Appl. No.: 782,584

[22] Filed: Oct. 25, 1991

[51] Int. Cl.$^5$ ............................................. G11B 5/55
[52] U.S. Cl. .................................. 360/106; 360/97.02
[58] Field of Search ............................. 360/106, 97.02

[56] References Cited

U.S. PATENT DOCUMENTS

| | | | |
|---|---|---|---|
| 4,331,990 | 5/1982 | Frandsen | 360/106 |
| 4,506,307 | 3/1985 | Watrous | 360/106 |
| 5,148,340 | 9/1992 | Watrous | 360/106 |
| 5,189,574 | 2/1993 | Imamura | 360/106 |

Primary Examiner—Edward P. Westin
Assistant Examiner—Andrew Sanders
Attorney, Agent, or Firm—Duft, Graziano & Forest

[57] ABSTRACT

A low pressure air bearing and rolling flexure bearing support for relative movement of carriage actuators in a disk drive system. Air generated by the disk rotation or by a simple blower mounted on the spindle is directed through conduits in the carriage support system. The air is channeled in small orifices formed into bearing pads to provide air pressure on both sides of planar carriages. The bearing pads extend beyond the direction of travel of the carriages. By providing air pressure over relatively large areas of the carriages, low pressure air can be used, generated by the system itself. Rolling flexure bearings provide constraint tot he carriage orthogonal to that of the air bearing and to the direction of travel.

29 Claims, 4 Drawing Sheets

PLANAR ACTUATORS USING LOW PRESSURE AIR BEARINGS AND ROLLING FLEXURE BEARINGS

BACKGROUND OF THE INVENTION

1. Field of the Invention

The present invention relates to the field of actuators for magnetic disks.

2. Statement of the Problem

The performance of magnetic disk drives is limited by, among other factors, actuator access time and actuator contention. Actuator access time is the time it takes an actuator carrying a read/write head to move to the proper track on the magnetic data storage disk. This is constrained by the acceleration of the actuator due in part to the magnitude of the mass of the actuator and to the friction between the actuator and its surrounding structure.

Actuator contention is dependent upon capability of the system to manipulate a particular actuator to access a particular random track. Presently, individual actuators are used to allow individual heads to be positioned relative to the disk tracks. This requires additional support and guidance structure for each individual actuator. The prior art devices typically used ball bearings which increase the mass of the actuators and present a problem with vibration transmitted through the system.

Frandsen U.S. Pat. No. 4,331,990, discloses a plurality of actuators, each with flat wire loops mounted on a planar carriage frame which, in turn, is mounted on roller bearings to reduce the mass and the inefficiencies of the voice coil motor system. This system still requires considerable spacing between the carriages. This increases the overall size, mass and friction of the system, as well as contributing to inefficiencies in the magnetic flux.

Watrous U.S. Pat. No. 4,506,307, discloses an actuator using air bearings on parts of eight of the surfaces of an X-shaped structure of the actuator to reduce the mass of the system. The air bearings must be supplied by an external blower.

There still presently exists a need for an actuator mechanism utilizing a friction free support system for the carriage actuators and having damping capabilities to restrain against vibration in the system.

3. Solution to the Problem

The present invention solves these and other problems by providing a high performance disk drive having a plurality of single arm actuators.

The present invention provides a low mass, low profile actuator having a high efficiency and extremely low friction.

The present invention provides a system where multiple actuators may easily be stacked at the normal disk spacing with as many carriages as desired.

SUMMARY OF THE INVENTION

The present invention provides an air bearing support for relative movement of carriage actuators in a disk drive system. Air generated by the disk or by a simple blower mounted on the spindle is directed through conduits in the carriage support system. The air is channeled into small orifices formed into bearing pads to provide air pressure on both sides of planar carriages. The bearing pads extend beyond the direction of travel of the carriages. By providing air pressure over relatively large areas of the carriages, low pressure air can be used that is generated by the system itself.

In other embodiments of the invention, flexure bearings are used to add further constraint to the movement of the carriages.

The bearings of the present invention provide friction free movement of the carriages with high degree of stiffness to provide damping from vibration or shock.

These and other features will become evident from the following detailed description of the preferred embodiment taken in conjunction with the drawings.

DETAILED DESCRIPTION OF A PREFERRED EMBODIMENT

Figure 1:
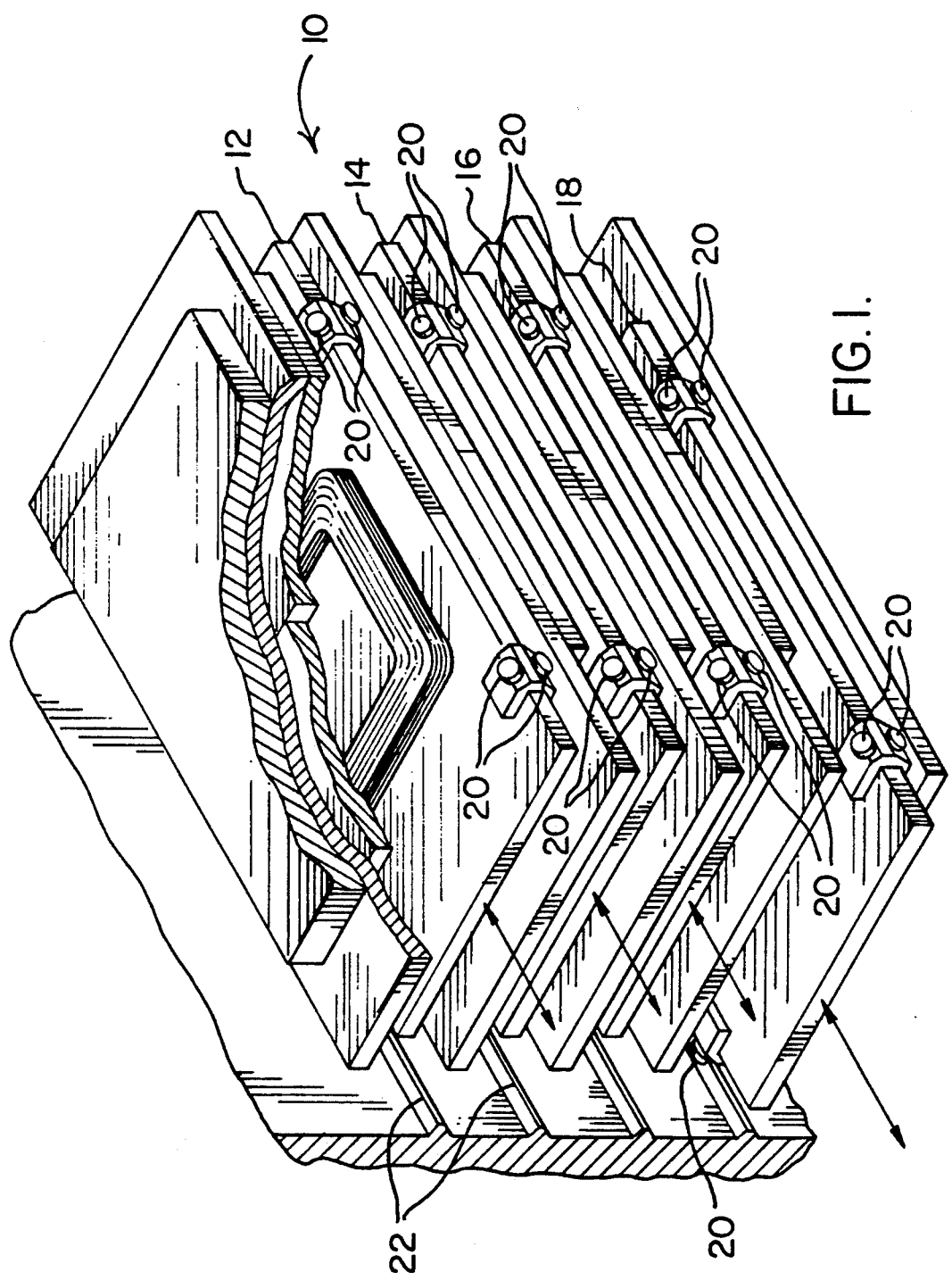
FIG. 1 illustrates a prior art device.

A typical prior art magnetic data storage disk drive system 10 is shown in FIG. 1. This system uses a plurality of individually operated actuator carriages 12, 14, 16, and 18. Each actuator carriage 12-18 is supported for individual movement on the surrounding support structure (not shown) relative to the disks (not shown) by at least 6 roller bearings 20 (all of which are not shown). The friction and mass of roller bearings 20 affect the performance of the drive. Bearings 20 produce wear and particulate contamination due to highly stressed rolling contact with the support rails 22. Further, the grease required to lubricate the bearings dries out causing detenting of the bearings. Bearings 20 must be initially aligned and the alignment maintained. All of these factors detrimentally affect the performance of the disk drives.

The present invention provides air bearing supports for the actuators. The air bearings of the present invention provide frictionless support for the actuators allowing linear movement of the actuators without the wear and particulate contamination of the prior art bearings. No alignment or lubrication is required. The air bearings of the present invention require low air pressure which can be generated internally by the system itself without the need for external blowers.

Figure 2:
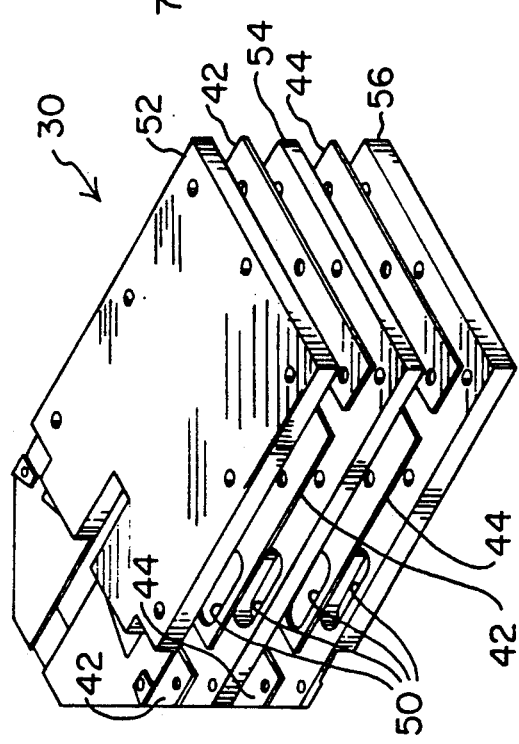
FIG. 2 shows a perspective view of one possible exemplary preferred embodiment of the present invention without the outer support structure.
Figure 3:
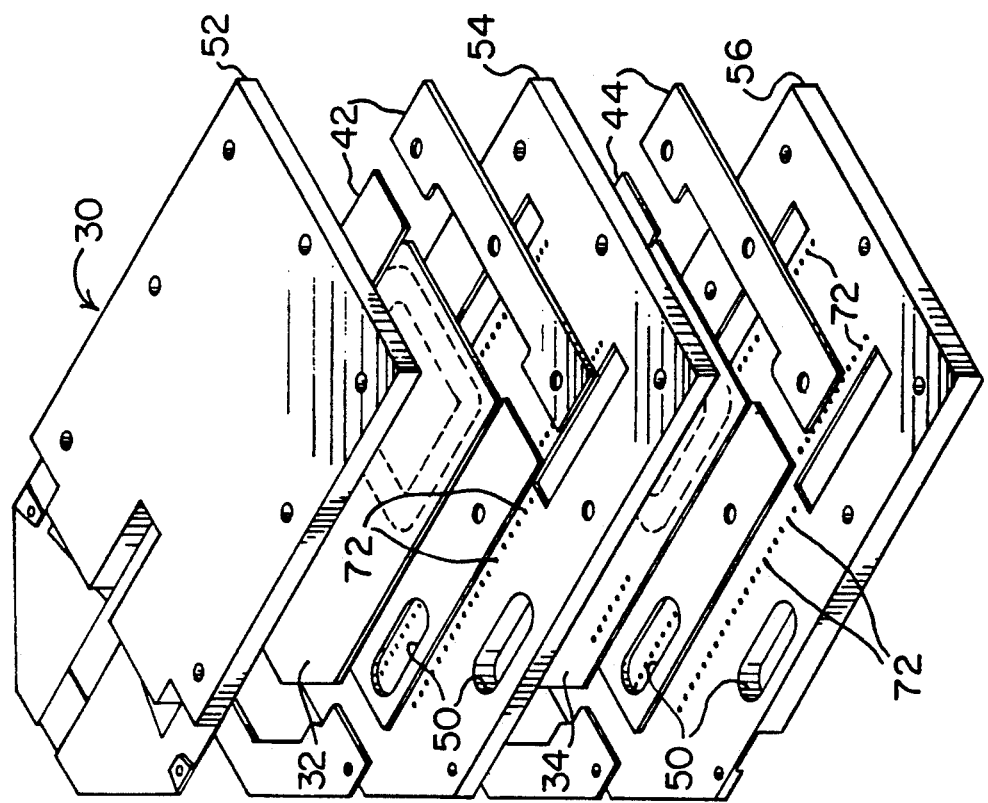
FIG. 3 shows an exploded view of one possible preferred embodiment of the present invention.

A partial view of one possible preferred exemplary embodiment of the invention is illustrated in FIG. 2. The external wall structure of the actuator mechanism system 30 is of conventional design and is not shown. The support structure for the actuator mechanism 30 is shown in an exploded view to display the elements of mechanism 30. Actuator mechanism 30 includes upper actuator support structure 52, center actuator support structure 54 and lower actuator support structure 56. Actuators 32, 34, shown in FIG. 3, are linearly movable between these supports 52, 54, 56. Actuators 32, 34 include planar upper and lower surfaces and are designed to have a relatively low mass. Air flow is directed through supports 52, 54, 56 by vertical channels 50 formed therein and onto the planar surfaces of actuators 32, 34 to form the air bearings. The structure directing the air flow is explained in greater detail below.

Air bearing spacers 42, 44 are sandwiched between upper support 52 and central support 54 and between central support 54 and lower support 56. Actuators 32, 34 are adapted to linearly move within actuator supports 42, 44 and to be constrained from lateral movement, by rolling flexure bearings (not shown) described in detail below. Actuators 32, 34 are linearly movable parallel to and relative to the carriage support structure 52, 54, 56 to be controllably positioned over specified disk tracks (not shown).

Figure 4:
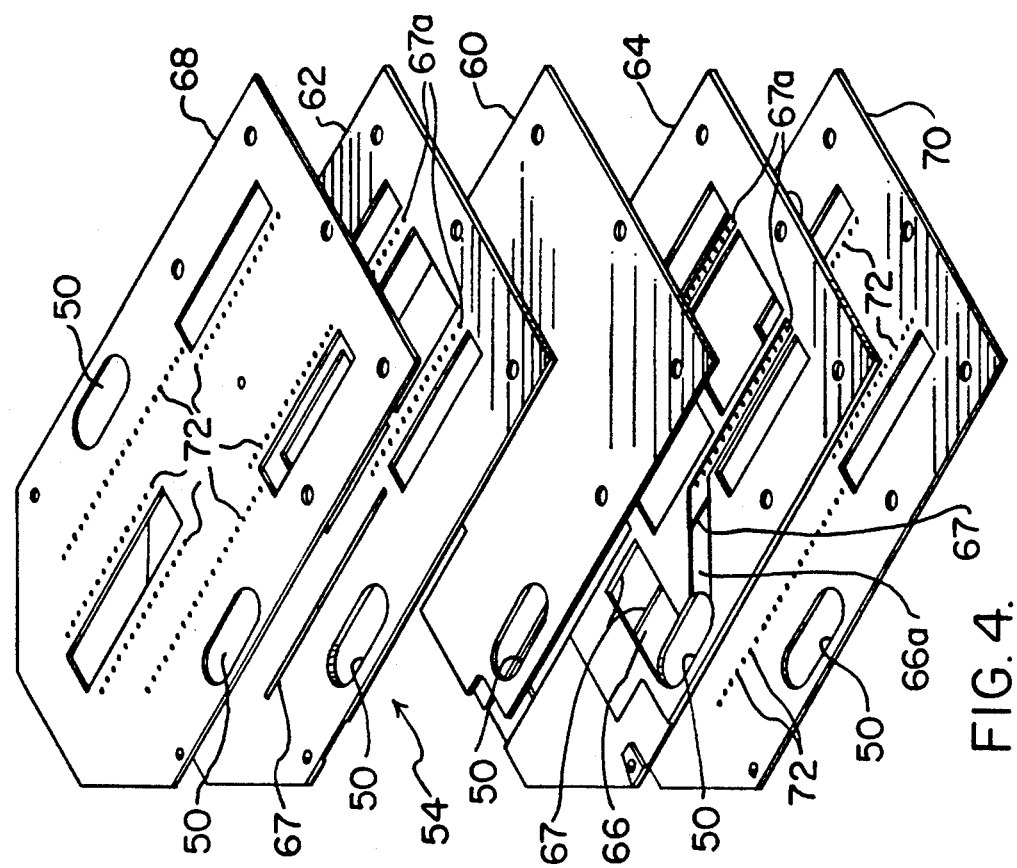
FIG. 4 shows an exploded view of the composite structure of the horizontal support between the actuators.

Support structures 52, 54, 56 include vertical conduits 50 adapted to conduct air flow generated internally within the system as discussed below. Upper support 52 provides air flow directed downward onto the upper planar surface of actuator 32. Center support 54, as generally illustrated in FIG. 3 and in detail in FIG. 4, is a double sided air bearing, providing air flow directed upward onto the lower surface of actuator 32 and air flow directed downward onto the upper surface of actuator 34. Lower support 56 provides air flow directed upward onto the lower surface of actuator 34.

Support structures 52, 54, 56 are composite structures having air channels formed therein. Supports 52, 56 are single sided versions of central support structure 54 which will be described first. Central support structure 54 shown in detail in FIG. 4 includes a flat, planar central magnetic plate 60 sandwiched by upper air bearing plate 62 and lower air bearing plate 64. Air channels are formed between the central magnetic plate 60 and lower air bearing plate 64 by side channels 66 and 66a formed partially in the upper surface of bearing plate 64, connected with vertical conduit 50 to receive the air flow therefrom. Similar air channels (not shown) are formed between the opposite side of the upper surface of plate 64 and central magnetic plate 60 receiving air flow from vertical conduits (not shown) formed on that side of bearing plate 64. Likewise, upper bearing plate 62 forms air channels with central magnetic plate 60 by similar side channels 66 and 66a (not shown) formed on its lower surface connected with vertical conduits 50 on either side of bearing plate 62, (one of which is not shown) to receive the air flow therefrom. A series of slots 67 and holes 67a (all of which are not shown) are formed in the bearing plates 62, 64 on the opposite surfaces from side channels 66, 66a and open partly into channels 66, 66a. Slots 67 and holes 67a extend along the length of the plates to direct the air flow from channels 66, 66a to various locations on the outer surfaces of air bearing plates 62, 64.

Upper bearing pad 68 is attached over upper bearing plate 62 and lower bearing pad 70 is attached below lower bearing plate 64. Bearing pads 68, 70 have orifices 72 formed through the pads at various locations across the surfaces of pads 68, 70 by either stamping or etching. Orifices 72 are located to receive the air flow from slots 67 and 67a and force the air onto actuators 32, 34, as shown in FIG. 3, under pressure to form the air bearings.

The use of orifices 72 arranged to provide air pressure over substantially all of the entire planar surfaces of actuators 32, 34 allows the use of relatively low air pressure. This enables the air flow to be generated internally within the system as discussed below.

Support structures 52 and 56, shown in FIG. 3, are formed similar to support structure 54 except that only a single air bearing plate and bearing pad are mounted onto a support plate. Support structure 52 includes a bearing plate similar to plate 64 of support 54 and a bearing pad similar to pad 70 of support 54. The pad has orifices formed therein so that air flow is received from vertical conduit 50 on either side of the structure and directed through channels similar to channels 66, 66a, slots similar to slot 67 and holes similar to hole 67a, through orifices similar to orifices 72 and onto the upper surface of actuator 32. This air flow equalizes the force from the air flow directed through bearing pad 68 to the lower surface of actuator 32.

Support structure 56 includes a bearing plate similar to plate 62 of support 54 and a bearing pad similar to pad 68 of support 54. Air is directed through channels in the bearing plate similar to channels 66, 66a through slots similar to slots 67 and holes 67a through orifices 72 to direct air flow against the lower surface of actuator 34. This air flow balances the forces against actuator to support actuator 34.

The bearing pads 68, 70 for each of the support structures can be extended beyond actuators 32, 34 in the direction of travel to maximize the bearing stiffness for all carriage positions.

By using air bearings operating on substantially all of the planar surfaces of at least both planar sides of the carriages and over a close spacing, very low air pressures can be used. For example, a double sided air bearing operating on five inches of water pressure and over five square inches of surface with a spacing of 0.0025 inches on each side between the actuators 32, 34 and the bearing pads 68, 70, a spring rate on the order of 700 lbs/inch is developed. This is stiff enough to support a very low mass carriage with zero friction and very high damping to transverse vibration.

It is to be expressly understood that this description is for the purpose to explain the claimed invention. The scope of the inventive concept is not meant to be limited by this description. Other modifications and variations within this inventive scope are considered to be within the range of the claimed invention. For instance, any number of actuators can be used by adding additional central support structures.

Figure 5:
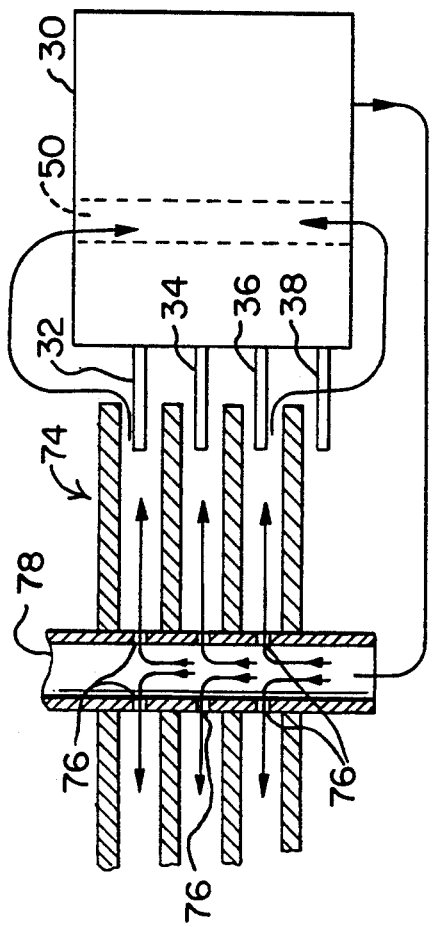
FIG. 5 shows the air flow generated by the rotating disks.

The air flow can be generated either directly by the data storage disks themselves or by a simple blower mounted on the spindle supporting the disks. As shown in FIG. 5, rotating data storage disks 74 generate air flow which is directed through holes 76 formed in the hollow spindle 78 which support disks 74. This air flows from the disks within the disk enclosure (not shown) to conduits 50 formed in the support structures where it is supplied to the bearing pads to create the air bearings on the actuators. The air leaving the air bearings is conducted by well known means back to the hollow spindle to flow back onto the disks.

Figure 6:
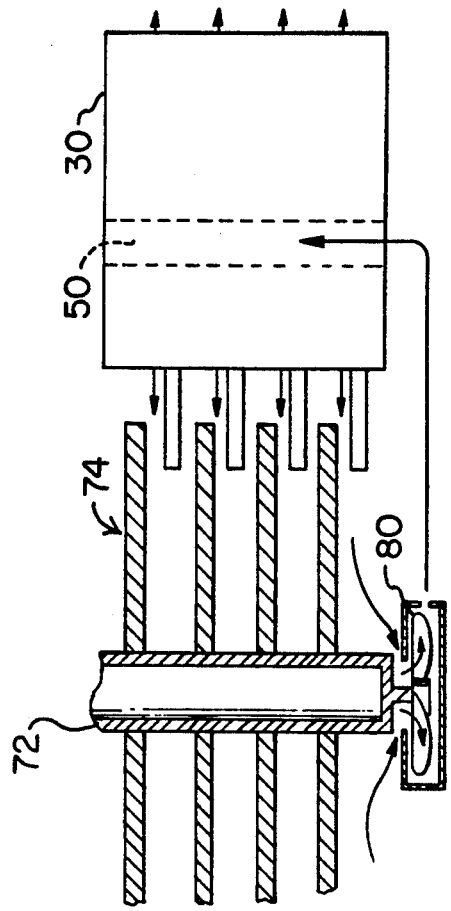
FIG. 6 shows the air flow generated by a fan mounted on the spindle.

Smaller size disks may not be able to generate sufficient air flow to create the necessary air pressure. If the air circulation is insufficient to provide adequate air pressure to the bearing pads, then a second embodiment, as illustrated in FIG. 6, using a simple blower 80 mounted on spindle 78 can be utilized to generate the air flow and pressure.

Previous actuator mechanisms used air bearings to support carriage actuators, but these were primarily used only on limited areas of the carriages and required relative high pressures. The high pressures necessitated the use of external blowers to generate sufficient air pressure for the bearings.

This design eliminates the need for high pressure air bearings and enables the use of self generated air flow by the rotation of the disks or by a simple blower mounted internally to the system.

Figure 7:
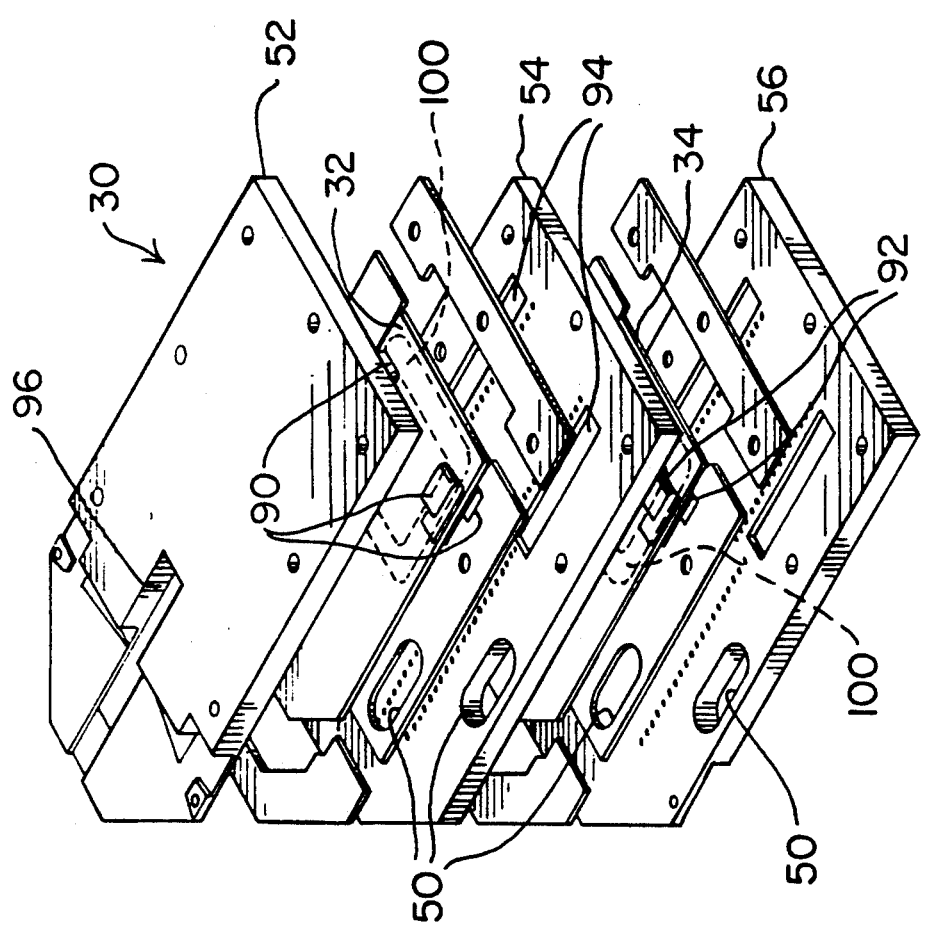
FIG. 7 shows the addition of a rolling flexure bearing and an embedded linear coil.

The present embodiment of the invention is shown in FIG. 7, using rolling flexure bearings to constrain the lateral movement of the actuators 32, 34. Flexure bearings 90 are positioned in openings 94 in support structures 52, 54, 56 (not all are shown) between actuators 32, 34 and support structures 52, 54, 56. Similar flexure bearings are positioned in openings 96 between actuators 32, 34 and support structure 52, 54, 56. Similarly, flexure bearings 92 constrain the lateral movement of actuator 34 between support structure 54, 56. Flexure bearings 90, 92 are of a type as disclosed in related application Ser. No. 07/771,652. Flexure bearings 90, 92 are formed of thin sheets of elastic material that have a first end portion attached to the support structure and a second end portion attached to the actuator. The sheets make a 180 degree bend about an axis perpendicular to the direction of movement of the carriages. The flexure bearings allow relatively friction free travel in one direction, highly constrain movement in a direction perpendicular to the travel direction and have a high rate of compliance in the direction orthogonal to the other two directions.

The use of flexure bearings add constraint to the system in the direction perpendicular to the direction of travel. The air bearings provide stiffness to the carriages in the orthogonal direction and provide damping against vibration and shock.

The air bearing structure with or without the flexure bearings is contemplated as particularly effective with a flat planar carriage, such as disclosed in the related application Ser. No. 7/777,799. This carriage, as shown in FIG. 7, uses an embedded voice coil 100 in actuator 32, 34 with magnets (not shown) mounted within the support structures 52, 54, 56. This system allows air pressure to be applied to the full planar surfaces of the carriage for the air bearing support. The further addition of flexure bearings 90, 92 not only adds to the constraint on the system but allows the electrical leads for the embedded coil 100 to be provided through the flexure bearings 90, 92.

The present invention, as claimed, provides a low pressure air bearing and a rolling flexure bearing for guidance and support of a low mass, planar carriage. By using low pressure over the planar surfaces, air flow can be generated internally within the system itself, without the need for external blowers. This provides a low mass, low profile disk drive system. Damping is also added to the system to reduce susceptibility of vibration affecting the performance of the system.

The invention as claimed is not meant to be limited by the description of the preferred embodiment. Other variations and modifications are considered within the scope of the inventive concept.

I claim:

1. A carriage assembly for positioning at least one read/write head in a disk drive system having at least one rotating data storage disk, said carriage assembly comprising:
   a housing for said carriage assembly;
   at least one carriage having substantially flat planar upper and lower surfaces;
   means for moving said at least one carriage relative to said housing;
   means for providing a low friction support to said at least one carriage to allow said at least one carriage to move relative to said housing along one axis; wherein
   said support means include low pressure air bearing means having
      (1) an upper air bearing plate disposed above and adjacent to said top surface and a lower air bearing plate disposed below and adjacent to said lower surface; and
      (2) orifices formed in each of said air bearing plates for directing air under pressure directly against said planar surface of said at least one carriage to provide a supporting force to substantially all of the top planar surface of said at least one carriage and to substantially all of the bottom planar surface of said at least one carriage for supporting said at least one carriage in the vertical direction for substantially frictionless linear movement; and
   means for generating said air under pressure from the rotation of said at least one rotating data storage disk.

2. The assembly of claim 1 wherein said air directing means include:
   vertical channels formed in side walls of said housing; and
   channels formed above said upper bearing plate and below said lower bearing plate connecting said orifices to said side wall channels.

3. The assembly of claim 2 wherein said assembly comprises a plurality of said carriages, and said low pressure air bearing means for each of said carriages.

4. The assembly of claim 3 wherein said rotating disks are mounted on a hollow spindle having holes formed in the sides of said spindle; and said directing means include conduit means connecting said side wall channels to said spindle to direct said air flow through into said side wall channels and into said spindle into said side holes.

5. The assembly of claim 3 wherein said carriage assembly further comprises a blower connected to said spindle.

6. The assembly of claim 1 wherein said support means further include a thin sheet of flat elastic material having one end attached to said at least one carriage and an opposing end attached to an adjacent structure for relative movement between said at least one carriage and said adjacent structure;
   said sheet forming a C-shaped bend about an axis perpendicular to said one axis; and
   said at least one carriage is freely movable along said one axis perpendicular to said bend axis and is constrained from movement in the axis parallel to said bend axis.

7. The assembly of claim 6 wherein said low pressure air bearings provide stiffness in the axis normal to both said bend axis and said direction of travel.

8. The assembly of claim 7 wherein said air bearing means include an upper air bearing plate disposed above and adjacent to said top surface and a lower air bearing plate disposed below and adjacent to said lower surface; and
   orifices formed in each of said air bearing plates direct air under pressure directly against said carriage surfaces.

9. The carriage assembly of claim 8 wherein said disk drive system includes means for internally generating air flow; and means connected to said air flow generating means for directing said air flow to said upper bearing plate and said lower bearing plate to provide said air pressure on said upper carriage surfaces and said lower carriage surfaces.

10. The assembly of claim 9 wherein said air directing means include channels formed in side walls of said housing; and channels formed above said upper bearing plates and below said lower bearing plates connecting said orifices to said side wall channels.

11. The assembly of claim 10 wherein said disk drive system comprises a plurality of rotating data storage disks generating air flow from the rotation of said disks, and said air flow from said rotating disks is directed to said air bearing means to provide said air pressure on said carriage surfaces.

12. The assembly of claim 11 wherein said rotating disks are mounted on a hollow spindle having holes formed in the sides of said spindle; and said directing means include conduit means connecting said side wall channels to said spindle to direct said air flow into said side wall channels and through said spindle into said side holes.

13. The assembly of claim 1 wherein said carriage assembly further comprises a blower connected to a spindle.

14. A carriage assembly for positioning at least one read/write head in a disk drive system having at least one rotating data storage disk, said carriage assembly comprising:

a housing for said carriage assembly;
a at least one carriage having substantially flat planar lower and upper surfaces;
means for moving said at least one carriage relative to said housing;
support means including air bearing means for providing low friction support to said at least one carriage to allow said at least one carriage to move relative to said housing along a first axis; and wherein
said support means include a flexure bearing for constraining said at least one carriage from movement along a second axis perpendicular to said first axis; and
said support means further including low pressure air bearing means providing a force on the surfaces of said planar at least one carriage for providing stiffness to said planar at least one carriage in a direction orthogonal to said first and second axes;
wherein said air bearing means include an upper air bearing plate disposed above and adjacent to the upper surface of said at least one carriage and a lower air bearing plate disposed below and adjacent to the lower surface of said at least one carriage; and
orifices formed in each of said air bearing plates direct air under pressure directly against said carriage surfaces.

15. The assembly of claim 14 wherein said disk drive system includes means for internally generating said air flow, and means for directing said air flow to said upper bearing plate and said lower bearing plate.

16. The assembly of claim 15 wherein said air directing means includes channels formed in side walls of said housing; and channels formed above said upper bearing plates and below said lower bearing plates connecting said orifices to said side wall channels.

17. The assembly of claim 16 wherein said disk drive system comprises a plurality of rotating data storage disks generating air flow, and said air flow from said rotating disks is directed to said air bearing means.

18. The assembly of claim 17 wherein said rotating disks are mounted on a hollow spindle having holes formed in the sides of said spindle, and conduit means connecting said side wall channels to said spindle and said air flow generated by said disks is directed through said side wall channels and into said spindle to said side holes.

19. The assembly of claim 16 wherein said carriage assembly further comprises a blower connected to said spindle.

20. The assembly of claim 19 wherein said rolling flexure support means include a thin sheet of flat elastic material having one end attached to said at least one carriage and an opposing end attached to an adjacent structure for relative movement between said at least one carriage and said adjacent structure;

said sheet forming a C-shaped bend about an axis between said at least one carriage and said adjacent structure; and said at least one carriage is freely movable in an axis perpendicular to said bend axis and is constrained from movement in the axis parallel to said bend axis.

21. A low pressure air bearing for a linearly movable actuator in a disk drive system, said air bearing comprising:

an upper air bearing plate disposed above and adjacent to the top surface of said actuator;
a lower air bearing plate disposed below and adjacent to the lower surface of said actuator;
means for generating air flow;
means for conducting said air flow to said upper bearing plate and to said lower bearing plate; and
a plurality of orifices formed in said upper bearing plate and said lower bearing plate connected to said conducting means receiving said air flow; said orifices having relatively small diameters to increase the pressure of said air flow applying said air flow to substantially all of the surfaces of said actuator whereby said actuator is supported for substantially frictionless linear movement;
wherein said disk drive system includes rotating data storage disks mounted on a hollow spindle; and
said means for generating air flow includes means connecting said conduit means and said spindle to direct air generated by said rotating data storage disks through said conduit means and into said spindle and through air holes formed in said hollow spindle.

22. The air bearing of claim 2 wherein said generating means include a blower mounted to a spindle.

23. The air bearing of claim 21 wherein said air bearing further includes a thin sheet of flat elastic material having one end attached to said at least one carriage and an opposing end attached to an adjacent surface for relative movement between said at least one carriage and said adjacent structure;

said sheet forming a C-shaped bend about an axis perpendicular to said one axis; and said at least one carriage is freely movable along said one axis perpendicular to said bend axis and is constrained from movement in the axis parallel to said bend axis.

24. The assembly of claim 23 wherein said low pressure air bearings provide stiffness in the axis normal to both said bend axis and said direction of travel.

25. A carriage assembly for positioning at least one read/write head in a disk drive system, said carriage assembly comprising:

a housing for said carriage assembly;

a at least one carriage adapted for linear movement relative to said housing;

means for moving said at least one carriage relative to said housing;

air bearing means for supporting said at least one carriage for substantially frictionless movement relative to said housing; and means internal to said housing for generating air flow for said air bearing means;

wherein said internal air generating means include:

(1) a plurality of rotating data storage disks; and (2) means directing the air flow generated from the rotation of said disk to said air bearing means;

wherein said rotating disks are mounted on a hollow spindle having holes formed in the sides of said spindle; and said air flow from said rotating disks is directed through said air bearings into said hollow spindle and into said spindle side holes; and wherein said air bearing means include an upper air bearing plate disposed above and adjacent to the top surface of said at least one carriage and a lower air bearing plate disposed below and adjacent to the lower surface of said at least one carriage;

orifices formed in each of said air bearing plates directing air under pressure directly against said carriage surfaces; and said air directing means include:

vertical channels formed in side walls of said housing; and channels formed above said upper bearing plate and below said lower bearing plate connecting said orifices to said side wall channels.

26. The assembly of claim 25 wherein said assembly comprises a plurality of said carriages, and said bearing means for each of said carriages.

27. The assembly of claim 25 wherein assembly further includes a thin sheet of flat elastic material having one end attached to said at least one carriage and an opposing end attached to an adjacent structure for relative movement between said at least one carriage and said adjacent structure;

said sheet forming a C-shaped bend about an axis perpendicular to said one axis;

said at least one carriage is freely movable along said one axis perpendicular to said bend axis and is constrained from movement in the axis parallel to said bend axis; and said air bearings provide stiffness in the axis normal to both said bend axis and said direction of travel.

28. A method for providing low friction support for a linearly moving actuator having substantially flat planar upper and lower surfaces in a disk drive system having rotating data storage disks, said method comprising the steps of:

generating air flow from the rotation of said disks;

conducting said air flow to air bearing plates mounted adjacent said upper and lower surfaces of said actuator; and applying said air flow under low pressure to substantially the entire planar surfaces of said actuator to provide substantially frictionless support for said linearly moving actuator; and wherein said method further includes the step of:

mounting a thin sheet of elastic material bent into a curvilinear shape between said actuator and said bearing plates to provide additional support for said actuator.

29. A method for providing low friction support for a linearly moving actuator having substantially flat planar upper and lower surfaces in a disk drive system having rotating data storage disks, said method comprising the steps of:

generating air flow from the rotation of said disks;

conducting said air flow to air bearing plates mounted adjacent said upper and lower surfaces of said actuator; and applying said air flow under low pressure to substantially the entire planar surfaces of said actuator to provide substantially frictionless support for said linearly moving actuator; and wherein said method further includes the steps of:

providing a plurality of actuators in said system; and providing said air flow to the upper and lower surfaces of each of said plurality of actuators; and wherein said method further includes the steps of:

mounting a thin sheet of elastic material bent into a curvilinear shape between each of said plurality of actuators and said bearing plates to provide additional support for each of said plurality of actuators.

* * * * *